United States Patent Office 3,223,758
Patented Dec. 14, 1965

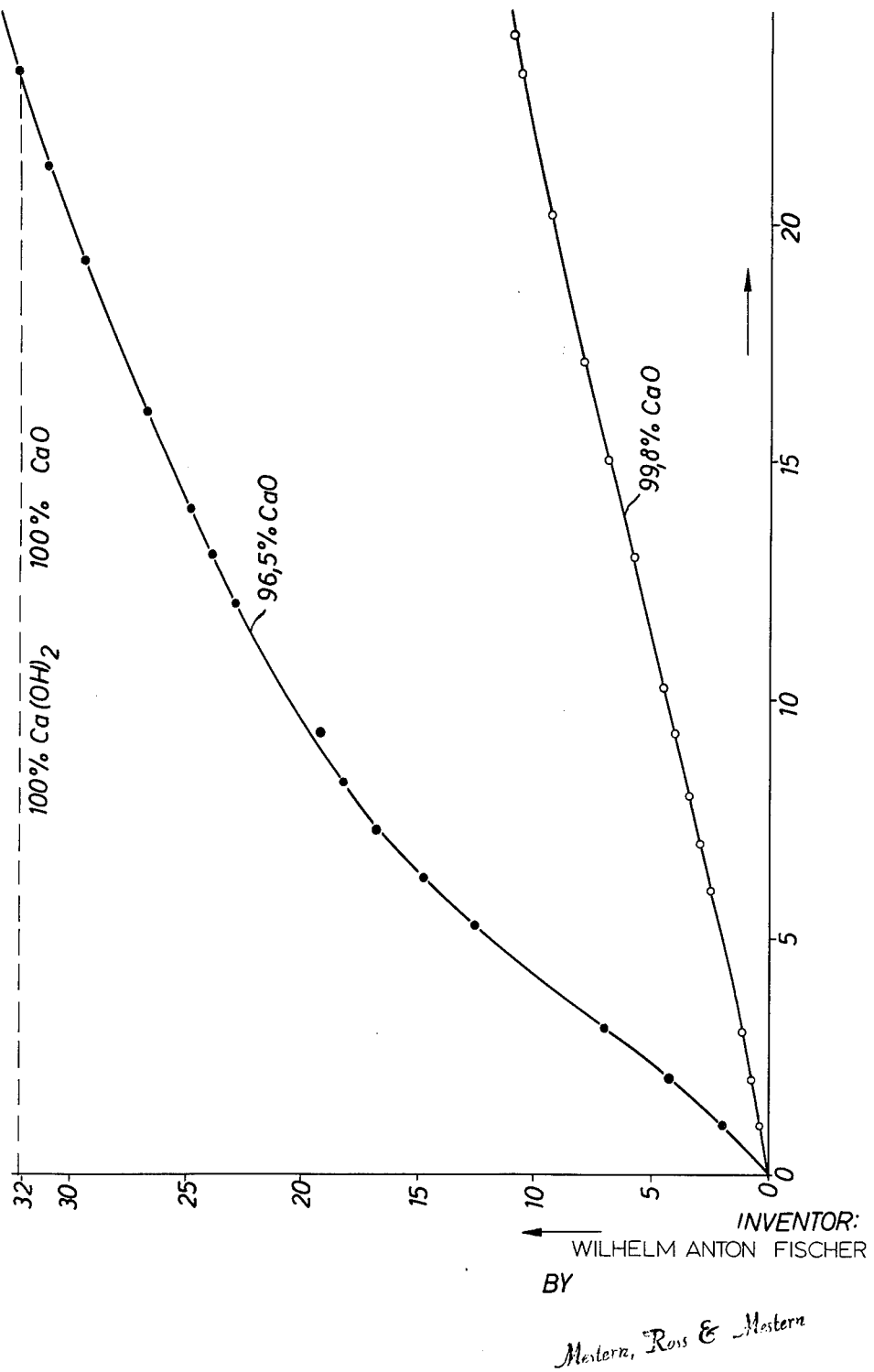

3,223,758
PROCESS FOR THE PRODUCTION OF LININGS
FOR METALLURGICAL FURNACES
Wilhelm Anton Fischer, Ratingen, Germany, assignor to Max-Planck-Institut fur Eisenforschung, Dusseldorf, Germany, a corporation of Germany
Filed July 26, 1962, Ser. No. 212,595
Claims priority, application Germany July 29, 1961
1 Claim. (Cl. 264—30)

Basic linings for metallurgical furnaces, especially for furnaces for producing and treating iron and steel, consist chiefly of calcined dolomite or magnesite, which are worked up either in the form of ramming masses or of shaped bricks. The suitability of these materials depends in any particular case on the nature of the processes taking place in the furnaces. At the same time, constancy of volume, mechanical strength with rapid change in temperature and, in particular, great capacity for chemical resistance to liquid slags are demanded of the linings. The last-mentioned property plays a special part in the production and treatment of iron and steel by way of the liquid phase, because the result of the metallurgical processes and the quality of the product depend decisively on the nature of the reacting slags, which nature may vary detrimentally through the absorption of constituents from the lining. For example, basic slag may dissolve so high a proportion of MgO out of sintered dolomite and magnesite linings having a MgO content of about 40 or 80 to 90%, respectively, that not only is the value of this slag as a fertilizer impaired, but the metallurgical result of the refining process is also considerably interfered with owing to the unfavorable influence of the MgO on the degree of fluidity of the slag.

The object of the invention is to render lime (CaO) usable for making highly basic linings for metallurgical furnaces, especially furnaces for treating and producing iron and steel. As calcium oxide (CaO) is the primary constituent of all basic slags, the constitution of the slags produced by the process would not be impaired if the slags were to absorb CaO from a lining consisting of lime in the course of the processes. A prerequisite, however, is that the linings consisting of lime should otherwise meet all requirements of a high-grade lining, such as constancy of volume, mechanical strength with rapid change in temperature and high wear resistance.

Extensive tests have shown that a lining of this kind consisting of lime for metallurgical furnaces can be produced by melting lime (CaO) calcined in the usual manner, comminuting the cooled molten lime by crushing, granulation or grinding and working it up as ramming mass or in the form of bricks as a lining. The melting of the lime can be carried out in an electric arc furnace.

Masses to be used as lining material for metallurgical furnaces must, practically speaking, not become hydrated and more or less disintegrate even when stored in the air for lengthy periods. It has now been found that the rate of hydration of comminuted fused lime depends to a considerable extent on the purity of said fused lime. This is apparent from the graph shown in the drawing. In this graph there is indicated in percent, referred to the initial weight, the increase in weight which fused lime with different CaO contents undergoes in dependence on time when it is hydrated in water vapor-saturated air at 25° C. It will be seen that the hydration of the fused lime occurs all the more slowly the higher the CaO content of the fused lime. The applies not only to the fused lime investigated, with a grain size of about 2 mm., but to all grain fractions of mechanically comminuted fused lime.

Starting from recognition of this fact, the invention therefore further proposes that there be employed as lining for metallurgical furnaces, in particular for furnaces for treating and producing iron and steel, a fused lime comminuted by granulation, crushing or grinding, the CaO content of which is at least 98%. A fused lime of this purity is obtained by placing commercially pure, completely dead-burned lime in an arc furnace and so conducting the melting process that the impurities diffuse out of the interior of the fused cake into the outer sintered shell. This occurs with a melting and cooling process which proceeds sufficiently slowly. The fused lime thereafter freed from the impure outer shell and then mechanically comminuted and containing at least 98% of CaO can be stored in the atmosphere until it is used as ramming mass or until it is worked up into shaped bricks, without its grain dimensions and its specific gravity changing appreciably.

Finally, it has also been found that the properties of a lining mass consisting of fused lime comminuted by crushing, granulation or grinding can also be enhanced by replacing that proportion of the mass which consists of grain below 0.12 mm. by sintered or fused magnesia of the same grain size. Such a product is suitable in particular as ramming mass for the lining of furnaces in which there are to be treated soft carbon steels or charges which are smelted entirely or partially from scaled scrap. A lining mass consisting of fused lime and in which the fine constituent below 0.12 mm. is replaced by sintered or fused magnesia may also contain small amounts of one of the known fluxes, for example boric acid. On using a furnace lining consisting of a ramming mass of the following composition: 40 to 60% of fused lime having a grain size of 1 to 4 mm., 10 to 15% of fused lime having a grain size of 0.25 to 1 mm., 10 to 15% of fused lime having a grain size of 0.12 to 0.25 mm. and 20 to 30% of sintered or fused magnesia having a grain size below 0.12 mm., to which 1 to 4% of boric acid was added, the service life of the lining when smelting soft carbon steels was increased by about 50% compared with a lining which consisted only of fused lime of like grain composition.

Also important is the fact that the lining mass consisting of fused lime and in which the fine constituent below 0.12 mm. has been replaced by sintered or fused magnesia of the same grain size has a thermal conductivity substantially lower than that of the known linings consisting only of sintered or fused magnesite. Finally, it has been found from numerous tests and observations that lime-containing slags, for example basic slags, do not, practically speaking, dissolve MgO out of a fused lime lining in which the proportion of grains below 0.12 mm. has been replaced by sintered or fused magnesia of the same grain size, so that when such a lining mass is employed there is also no impairment of the metallurgical action and the utilizability of the slags, for example as fertilizers.

I claim:
A method of making a lining for a metallurgical furnace for the treatment of ferrous melts in the presence of liquid slags, comprising the steps of dead-burning lime; melting the dead-burnt lime in an arc furnace to produce a fused mass having little tendency toward hydration; cooling said mass slowly to concentrate impurities in one portion of said mass while rendering another portion of said mass substantially free from impurities and imparting to said other portion a purity of at least 98% calcium oxide; comminuting said other portion of said mass; and applying the comminuted mass to a furnace wall.

(References on following page)

References Cited by the Examiner

UNITED STATES PATENTS

| | | | |
|---|---|---|---|
| 785,841 | 3/1905 | Turner | 264—30 |
| 1,704,902 | 3/1929 | Rohn | 264—30 |
| 2,876,122 | 3/1959 | Whittemore | 106—63 |
| 2,943,240 | 6/1960 | Martimet | 264—30 |

OTHER REFERENCES

Ceramic Products Cyclopedia, 5th Edition, July 1931, pages 437–438 relied upon.

ROBERT F. WHITE, *Primary Examiner.*

TOBIAS E. LEVOW, ALEXANDER H. BRODMERKEL, *Examiners.*